June 24, 1930.  E. PRAT  1,766,534
FURNACE
Filed April 27, 1927  2 Sheets-Sheet 1

Inventor
EMILE PRAT
By his Attorney

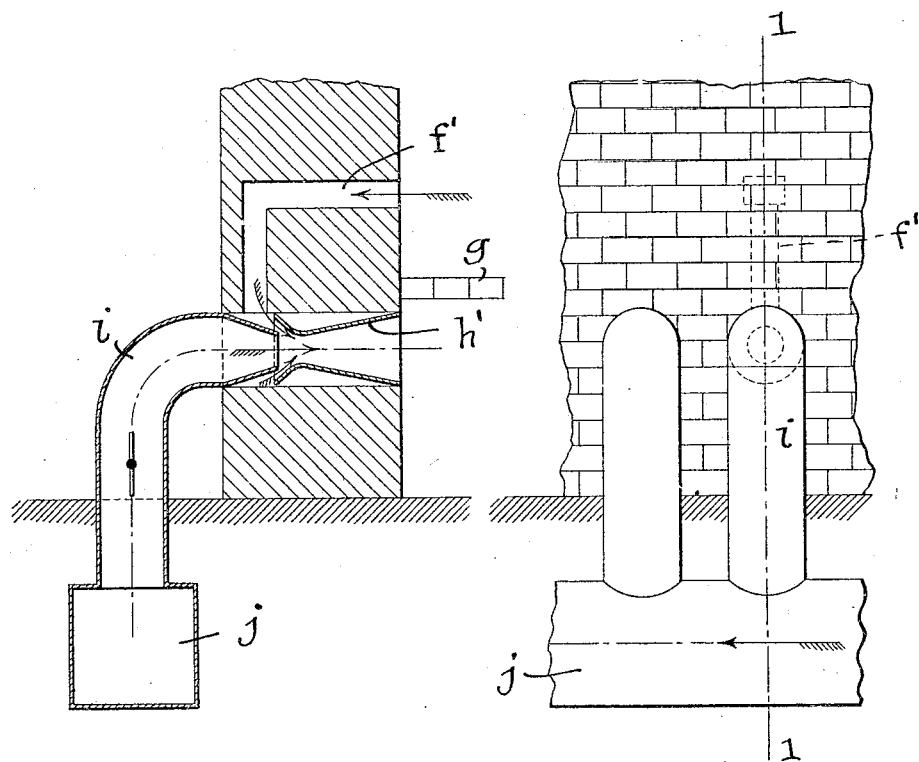

Patented June 24, 1930

1,766,534

UNITED STATES PATENT OFFICE

EMILE PRAT, OF PARIS, FRANCE, ASSIGNOR TO PRAT-DANIEL CORPORATION, OF NEW YORK, N. Y., A CORPORATION OF NEW YORK

FURNACE

Application filed April 27, 1927, Serial No. 187,057, and in France April 28, 1926.

This invention relates to means for preheating the air of combustion in furnaces, such as those of boilers. Preheating which has for its object to increase the temperature in the furnace and thus improve combustion has been obtained hitherto by the employment of heaters in which a portion of the calories contained in the gases issuing from the furnace is transmitted to the air by various means. It has also been suggested to heat the air by admixing to it a certain amount of said gases. The present invention relates to means for obtaining heating by admixture of gases extracted from the furnace or boiler, instead of gases exhausted therefrom.

By this means it is possible to heat the air to a higher temperature with a much smaller amount of very hot gases, which presents the advantage over known methods of not reducing materially the proportion of oxygen contained in the air of combustion and permitting of heating it to a higher temperature. Although the gases thus extracted from the furnace are no longer utilized therein, the reduction of heat transmission by convection is much smaller than the increase of heat transmission by radiation due to the increase of temperature in the furnace, so that efficiency is finally improved.

Heating of air by gases extracted from the furnace may be combined with the usual heating by a heater, but in such case it is often convenient to place the blower in proximity to the air heater, so that the blast conduit of air is under pressure at the level of the furnace.

Figure 1:
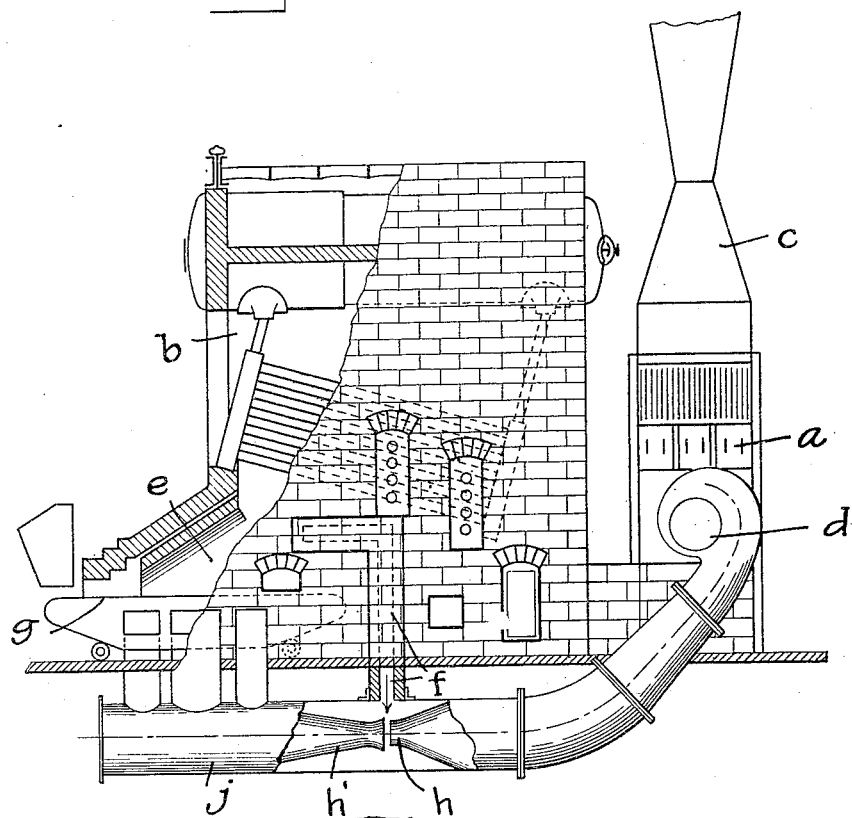
Figure 2:
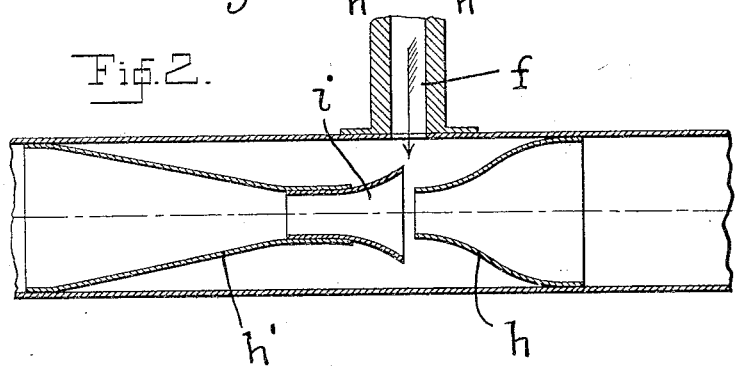

In the accompanying drawings which show diagrammatically by way of example various embodiments of the invention: Figure 1 is an elevation partly in section of a boiler provided with one form of the device; Figure 2 shows a modification of the means for extracting the gases from the furnace; Figure 3 is a section, at right angles to Figure 1, of a modified form of the invention as applied to one of the blast sections of a furnace grate with divided blasts, and Figure 4 is an end view of Figure 3.

An air heater $a$ (Fig. 1) receives the combustion gases issuing from a boiler $b$ and discharged to a chimney $c$. The combustion air is drawn by a blower $d$ through the heater $a$ and forced through the conduit $j$ to the furnace or hearth $e$. A small portion of the gases is extracted from the furnace through the channel $f$ in the brickwork and mixed with the air blown by the blower $d$ to the furnace grate $g$.

The suction of gases through the channel $f$ may be effected by an ejector interposed in the blast conduit of the blower and formed by a convergent cone $h$ and a diffuser or divergent cone $h'$ suitably dimensioned to generate a negative pressure sufficient for the suction of hot gases.

The ejector may be provided with a control device such as shown in Figure 2, the inlet of the divergent cone $h'$ being formed by a movable member $i$ adapted to be moved to and from the convergent cone $h$ so as to vary the amount of hot gases drawn through the channel $f$.

If the blower is placed close to the furnace the channel $f$ may be connected to the suction of the blower, the ejector being omitted.

The invention may be applied to any furnace other than one having divided blasts on different sections of the grate such as shown in the drawings. In the latter case, the gases instead of being supplied to the conduit $j$ common to all of the sections as in Figure 1 may be supplied to one or more branch pipes leading to sections of the grate. As illustrated in Figures 3 and 4, the branch pipe $l$ from the general feed conduit $j$ receives gases from the furnace through a channel $f'$, and an ejector $h'$ is likewise placed on said branch pipe. The air forced by the blower through the conduit $j$ draws the gases from $f'$ into the ejector $h'$ and passes, thus heated, to the section of the grate $g$.

What I claim is:—

1. In combination with a furnace and an air heater, a blower and a conduit for conveying combustion air from said heater to the furnace, an ejector within said conduit and a duct terminating opposite said ejector and connected with the combustion chamber of the furnace.

2. In a furnace, a conduit having at least one branch connecting with the combustion chamber of the furnace, a duct leading from the combustion chamber of the furnace to said conduit, and means for sucking gases through the duct comprising a centrifugal fan blower, an ejector interposed in the blast conduit and comprising a convergent cone and a divergent cone straddling said conduit located in the zone where said duct connects with said conduit.

3. In combination with a furnace and the combustion chamber thereof, a conduit having at least one branch connected with said combustion chamber, an ejector adapted to withdraw gases from the combustion chamber of the furnace and mix them with air drawn from an outside source and to force said mixture into the combustion chamber of the furnace, a duct communicating with said conduit and leading to the combustion chamber of the furnace, and said ejector comprising a convergent cone straddling said conduit and having its outlet orifice in the zone of said duct, a flared cone-like member opposite said convergent cone and a diverging member straddling said duct and supporting said flaring cone-like member.

In testimony whereof I affix my signature.

EMILE PRAT.